(12) United States Patent
Yoshioka et al.

(10) Patent No.: US 8,578,190 B2
(45) Date of Patent: Nov. 5, 2013

(54) INFORMATION PROCESSOR CONFIGURED TO CHARGE EXTERNAL DEVICES

(75) Inventors: Kazuhiro Yoshioka, Akishima (JP); Toru Hanada, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 436 days.

(21) Appl. No.: 12/712,996

(22) Filed: Feb. 25, 2010

(65) Prior Publication Data

US 2010/0275001 A1    Oct. 28, 2010

(30) Foreign Application Priority Data

Apr. 28, 2009  (JP) ................................ 2009-109531

(51) Int. Cl.
*G06F 1/30* (2006.01)
(52) U.S. Cl.
USPC .......................................... 713/310; 713/300
(58) Field of Classification Search
USPC ...................... 713/300, 320, 324, 1, 100, 310
See application file for complete search history.

(56) References Cited

U.S. PATENT DOCUMENTS

| | | | | |
|---|---|---|---|---|
| 7,489,974 | B2 * | 2/2009 | Numano | 700/22 |
| 7,627,696 | B2 * | 12/2009 | Suematsu et al. | 710/14 |
| 7,987,376 | B2 * | 7/2011 | Inoue et al. | 713/300 |
| 8,078,893 | B2 * | 12/2011 | Umedu | 713/320 |
| 2006/0036885 | A1 * | 2/2006 | Hsieh | 713/300 |
| 2006/0085659 | A1 * | 4/2006 | Nishinaga et al. | 713/320 |
| 2007/0220290 | A1 * | 9/2007 | Tsai et al. | 713/300 |
| 2008/0307239 | A1 | 12/2008 | Watanabe et al. | |
| 2009/0206797 | A1 * | 8/2009 | Chueh et al. | 320/150 |
| 2010/0106981 | A1 * | 4/2010 | Sim | 713/300 |

FOREIGN PATENT DOCUMENTS

| | | |
|---|---|---|
| JP | 2001-100868 | 4/2001 |
| JP | 2001-117676 A | 4/2001 |
| JP | 2001-242965 A | 9/2001 |
| JP | 2006-053748 A | 2/2006 |
| JP | U3127705 | 11/2006 |
| JP | 2008-305195 | 12/2008 |
| JP | 2009-060716 A | 3/2009 |
| WO | WO 2007-027336 | 3/2007 |
| WO | WO 2009-031235 | 3/2009 |

OTHER PUBLICATIONS

Japanese Office Action, for Japanese Application No. 2010-220929, dated Sep. 20, 2011, in 9 pages.

(Continued)

*Primary Examiner* — Chun Cao
(74) *Attorney, Agent, or Firm* — Knobbe, Martens, Olson & Bear LLP (57) ABSTRACT

According to one embodiment, an information processor, includes: a storage module which stores a plurality of charging modes associated with a plurality of external devices to be charged when an operating system is not in operation; an input module which receives a charging mode selection request; and a test module which receives the charging mode in the received selection request from the storage module, and tests the charging mode on at least one of the external devices connected to the information processor.

5 Claims, 5 Drawing Sheets

(56) References Cited

OTHER PUBLICATIONS

"Method of using and charging external device," Kabushiki Kaisha Toshiba, Feb. 3, 2009 http://dynabook.com/assistpc/faq/pcdata/008444.htm.

"Method of using and charging external device," Kabushiki Kaisha Toshiba, Feb. 9, 2009 http://dynabook.com/assistpc/faq/pcdata/008444.htm.

Notice of Rejection mailed by Japan Patent Office on Jun. 8, 2010 in the corresponding Japanese patent application No. 2009-109531.

Decision to Grant a Patent mailed by Japan Patent Office on Sep. 7, 2010 in the corresponding Japanese patent application No. 2009-109531.

* cited by examiner

| SYSTEM SETUP (1/2) | ACPI BIOS version = X.XX |

―――― MEMORY ――――
Total                    = XXXXMB

―――― SYSTEM DATE/TIME ――――
Date(MM-DD-YYYY)   = XX-XX-XXXX
Time(HH: MM: SS)    = XX: XX: XX ―――― PASSWORD ――――
User Password        = NOt Registered
Supervisor Password  = NOt Registered ―――― HDD PASSWORD ――――
HDD                  = Built-in HDD
HDD Password Mode   = Master +User
User Password        = NOt Registered
Master Password      = NOt Registered ―――― BOOT PRIORITY ――――
Boot Priority   = HDD→FDD→CD-ROM→LAN
HDD Priority    = Built-in HDD→USB ―――― OTHERS ――――
Core Multi-Processing        = Enabled
Dynamic CPU Frequency Mode
                  = Dynamically Switch able
Execute-Disable Bit Capability
                             = Available
Virtualization TechNOlogy    = Disabled
Trusted Execution TechNOlogy
                             = Disabled
Auto Power On                = Enabled
Beep Volume                  = Medium
DiagNOstic Mode              = Disabled
USB Sleep and Charge         = Disabled ↑↓++: Select items      Space,BkSp: Change values     PgDn,PgUp: Change pages
Esc: Exit without saving    Home: Set default values    End: Save changes and Exit

INFORMATION PROCESSOR CONFIGURED TO CHARGE EXTERNAL DEVICES

CROSS-REFERENCE TO RELATED APPLICATIONS

This application is based upon and claims the benefit of priority from Japanese Patent Application No. 2009-109531, filed on Apr. 28, 2009, the entire contents of which are incorporated herein by reference.

BACKGROUND

1. Field

One embodiment of the invention relates to an information processor that supplies power through a universal serial bus while the information processor is off.

2. Description of the Related Art

Recently, a universal serial bus (USB: Registered Trademark) is becoming popular, and it has become possible to connect various electronic devices to an information processor, such as a personal computer (PC), through the USB. Such electronic devices (USB devices) include, for example, a keyboard, a mouse, a portable music player having a built-in battery configured to be charged by the PC, and the like.

Alongside with the widespread of the electronic device having the built-in battery, there is recently known a PC that can charge the USB device not only during the time when the power of the PC is on but also during the time when the power thereof is off. For example, Japanese Registered Utility Model No. 3127705 discloses such PC that switches between a circuit module and a power supply module depending on whether the PC is on or off, so that even when the PC is off, the power supply module of the PC can supply the power to the USB device.

Different types of recent USB devices often employ different settings in order to be charged through the USB. In particular, for example, there is known a USB device that employs a setting so that the USB device is charged through a power supply line only when a predetermined first voltage is applied to a data signal line. Further, there is known a USB device that employs a setting so that the USB device is charged through a power supply line only when a predetermined second voltage differing from the first voltage is applied to a data signal line. Still further, there is known a USB device that employs a setting so that the USB device is charged through a power supply line independently of a voltage supplied to a data signal line. Therefore, in order to charge each of the USB devices employing the aforementioned various settings (hereinafter, referred to as USB charging mode) while in the off state, a recent PC is configured to be able to select a USB charging mode that enables the USB device connected thereto to be charged, through an operating system (OS) utility of the PC.

However, conventionally, the USB charging mode employed to charge the USB device when the PC is off is selected through the OS utility while the OS is in operation. Hence, it is necessary to confirm whether the USB device connected to the PC can be charged in the selected USB charging mode, by turning off the PC power. As a result, it is necessary to turn the PC power off every time when the USB charging mode is tested, which causes the user's inconvenience.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processor, includes: a storage module configured to store a plurality of charging modes associated with a plurality of external devices to be charged when an operating system is not in operation; an input module configured to receive a charging mode selection request when the operating system is not in operation; and a test module configured to receive the charging mode in the received selection request from the storage module, and to test the charging mode on at least one of the external devices connected to the information processor.

According to another embodiment of the invention, an information processor, includes: a storage module configured to store a plurality of operation modes corresponding to a basic input/output system (BIOS) setup item; an input module configured to receive an operation mode selection request during power on self-test (POST) by the BIOS; and a test module configured to receive an operation mode in the received selection request from the storage module, and to test a procedure corresponding to the operation mode, upon receipt of the selection request during the POST.

Figure 1:
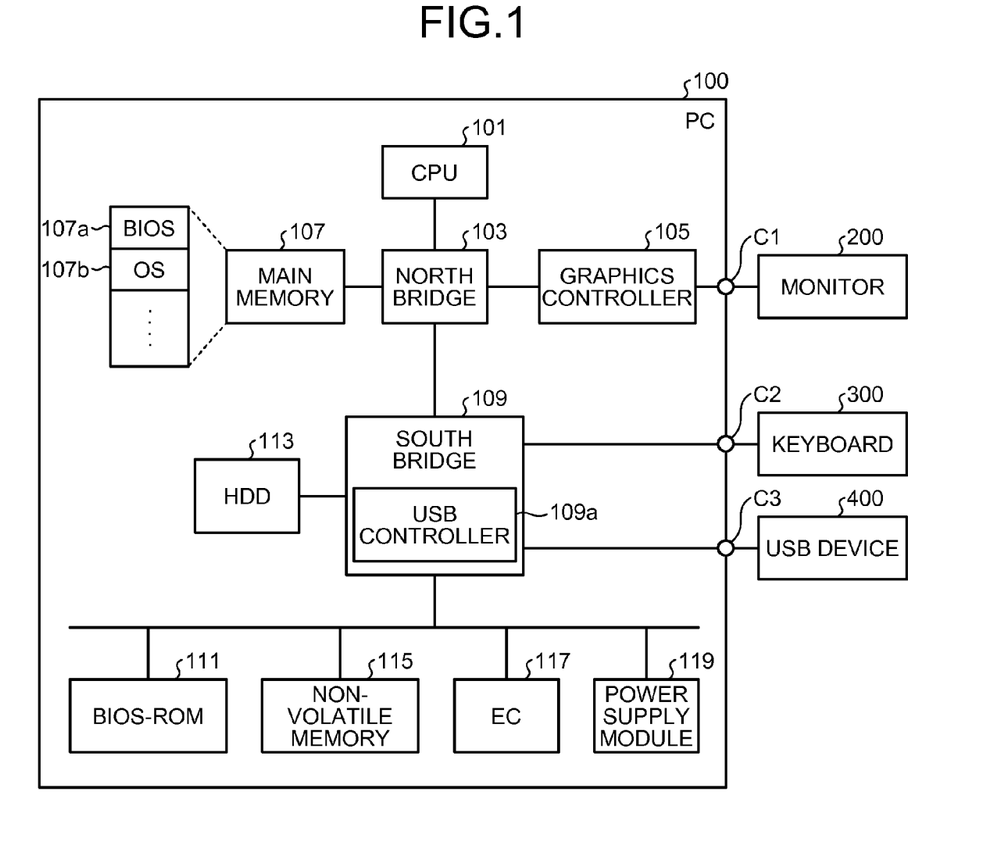
FIG. 1 is an exemplary block diagram of an information processor according to an embodiment of the invention.

One embodiment of the invention is explained with reference to FIGS. 1 to 6. In the embodiment, a personal computer (PC) is explained as an information processor. FIG. 1 is a block diagram schematically illustrating a configuration of a PC 100 of the embodiment together with peripheral devices. The PC 100 has a monitor 200, a keyboard 300, and a USB device 400 that communicates with the PC 100 according to the universal serial bus (USB) standard. In the following, when an operating system (OS) and a basic input/output system (BIOS) are not being booted, the PC is considered as being not in operation. For example, when the PC is shut down or the PC is in a power saving mode (standby mode), the PC is considered not in operation. Further, the PC is considered to be under power on self-test (POST) process when various hardware configuring the PC is being initialized by the BIOS that is booted when the PC is turned on by, for example, pressing the power button and the like of the PC by the user. Further, the PC is considered as being in operation when the OS is booted and being executed after the POST process.

The PC 100 has a central processing unit (CPU) 101, a north bridge 103, a graphics controller 105, a main memory 107, a south bridge 109, a basic input/output system-read only memory (BIOS-ROM) 111, a hard disk drive (HDD) 113, a non-volatile memory 115, an embedded controller (EC) 117, and a power supply module 119. In addition, the PC 100 has connectors C1 to C3 for connections to peripheral devices such as the monitor 200.

The CPU 101 controls an operation of the PC 100, and executes a BIOS 107a and an OS 107b loaded to the main memory 107 from the BIOS-ROM 111 and the HDD 113. The BIOS 107a initializes and evaluates a hardware such as the monitor 200 and the keyboard 300 during the POST process, and also perform USB charging test process described later on the USB device 400. The OS 107b is a basic software such as the Windows (Registered Trademark), and provides basic functions such as memory management and keyboard input commonly used by various application software.

The north bridge 103 is connected to the CPU 101, the graphics controller 105, the main memory 107, and the south bridge 109. The north bridge 103 includes an accelerated graphics port (AGP) controller, a host-peripheral component interconnect (PCI) bridge, a dynamic random access memory (DRAM) controller, and the like. The AGP controller provides the graphics controller 105 with an AGP interface. The host-PCI bridge connects between a local bus connecting between the CPU 101 and the north bridge 103 and a PCI bus connecting between the north bridge 103 and the south bridge 109. The DRAM controller controls communication between the main memory 107 and the CPU 101.

The graphics controller 105 is connected to the display (monitor) 200 such as a liquid crystal display (LCD) via the connector C1 such as a display connector. The graphics controller 105 includes a random access memory digital to analog converter (RAMDAC), a video random access memory (VRAM), a video chip, and the like. The graphics controller 105 generates video date based on a drawing instruction received from the CPU 101, writes the generated video data into the VRAM, and outputs finished video to the display 200.

The main memory 107 is connected to the north bridge 103. The BIOS 107a, the OS 107b, and the like are loaded into the main memory 107.

The south bridge 109 is connected to the BIOS-ROM 111, the HDD 113, the non-volatile memory 115, the EC 117, the power supply module 119, the keyboard 300, and the USB device 400. The south bridge 109 includes an integrated drive electronics (IDE) controller, a PCI-industrial standard architecture (ISA) bridge, a multi input/output (I/O) controller, a USB controller 109a, and the like. The IDE controller makes a connection to and controls the HDD 113. The PCI-ISA bridge connects between the PCI bus and the ISA bus. The multi I/O controller controls input and output via the keyboard 300 connected to the PC 100 via the connector C2 such as a personal system (PS)/2 keyboard connector. The USB controller 109a controls the USB device 400 connected to the PC 100 via the connector C3 such as a USB connector configured by a USB series A plug and a USB series A receptacle.

The USB controller 109a is a host controller that complies with, for example, a USB 2.0 standard. The USB controller 109a has an open host controller interface (OHCI) host controller core, a universal host controller interface (UHCI) host controller core, and an enhanced host controller interface (EHCI) host controller core, and the host controller cores are switchable in response to the data transfer speed with respect to the USB device. Further, the USB controller 109a controls the communication with respect to the USB device 400 when the PC is in operation, controls the USB device 400 in response to the USB charging mode tested by the USB charging test process described later during the POST process, and controls the USB device 400 in response to the USB charging mode enabled by the USB charging test process when the PC is not in operation.

The BIOS-ROM 111 is connected to the south bridge 109. The BIOS 107a is stored in the BIOS-ROM 111, and the BIOS 107a is loaded into the main memory 107 by the CPU 101, when necessary. The HDD 113 is connected to the south bridge 109. Various application software such as the OS 107b are stored in the HDD 113, and the software are loaded into the main memory 107 by the CPU 101, when necessary. In the embodiment, the BIOS 107a stored in the BIOS-ROM 111 is loaded into the main memory 107 and executed, when the PC is turned on. Further, the OS 107b (109a) stored in the HDD 113 is loaded into the main memory 107 and executed after the POST process by the BIOS 107a.

The non-volatile memory 115 stores therein five USB charging modes described later. Further, as will be described more in detail later, the non-volatile memory 115 stores therein enable/disable of the USB charging mode of when the PC is not in operation, in association with each USB charging mode.

In general, the USB device is charged only when a predetermined setting is applied thereto. In one case, a USB device is configured such that the USB device is charged through the power supply line only when a predetermined voltage is applied to the data signal line thereof. In other case, a USB device is configured such that the USB device is charged through the power supply line only when a signal with a predetermined waveform is applied thereto. Therefore, the PC 100 stores, as a USB charging mode, various settings including settings used to charge the aforementioned various USB devices and settings used to prohibit charging the USB device.

In the embodiment, five USB charging modes are stored in the PC 100, for simplicity of the explanation. Among the five USB charging modes, a charging prohibiting mode prohibits charging the USB device. In mode 1, a predetermined charging voltage is simply applied to the power supply line so that a USB device other than a USB device requiring a particular charging condition described later enabling the charging becomes capable of being charged. In mode 2, a predetermined voltage is applied to the data signal line so that a USB device that cannot be charged unless a certain voltage is applied to the data signal line becomes capable of being charged. In mode 3, a signal with a predetermined waveform is applied so that a USB device configured to be charged through the power supply line only when the signal with the predetermined waveform is applied becomes capable of being charged. In mode 4, a USB device that cannot be charged unless a predetermined voltage is applied to the data signal line and that complies with a certain standard.

The EC 117 performs power management of the PC 100. When the USB charging mode is set to the charging prohibiting mode, the EC 117 cuts off the power supply from the power supply module 119 to the USB device 400. When the USB charging mode is set to one of the mode 1 to mode 4, the power is enabled to be supplied from the power supply module 119 to the USB device 400. Under control of the EC 117, the power supply module 119 supplies power to each module of the PC 100 when the PC is in operation, and supplies power to configurations such as the power supply line of the USB requiring power when the PC is not in operation and/or during the POST process, when the PC is not in operation and/or during the POST process.

Figure 2:
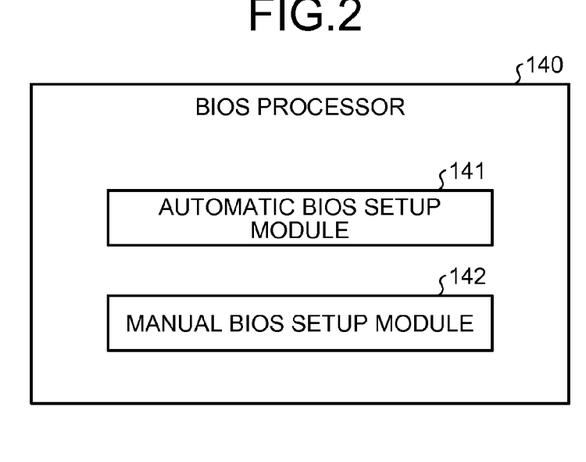
FIG. 2 is an exemplary block diagram of a BIOS processor in the embodiment.

Next, a BIOS processor 140 is explained. The BIOS 107a has a module configuration including a BIOS processor 140 that performs POST process such as hardware test and initialization. The BIOS 107a is read out from the BIOS-ROM 111 and executed by the CPU 101 when the power of the PC is turned on. Then, the BIOS processor 140 is loaded to the main memory 107, and the BIOS processor 140 is generated on the main memory 107 (111), as an actual hardware. As illustrated in FIG. 2, such BIOS processor 140 includes an automatic BIOS setup module 141 and a manual BIOS setup module 142.

Figure 3:
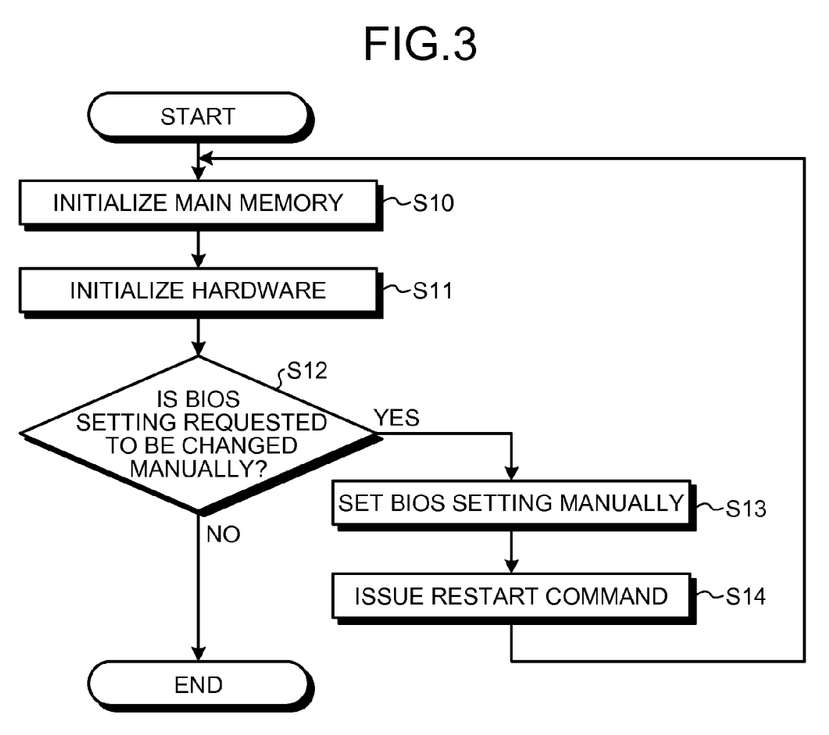
FIG. 3 is an exemplary flowchart of automatic BIOS setup process in the embodiment.

The automatic BIOS setup module 141 is explained with reference to FIG. 3. FIG. 3 is a flowchart of automatic BIOS setup process executed by the automatic BIOS setup module 141. The automatic BIOS setup module 141 first initializes the main memory (S10), and initialize various hardware (S11).

Next, the automatic BIOS setup module 141 determines whether an input of a manual BIOS setup request is received (S12). In particular, during the POST process, the automatic BIOS setup module 141 monitors whether a particular key such as F1 key of a keyboard, for example, is pressed down by the user. Then, when it is determined that the manual BIOS setup is not requested (No at S12), the automatic BIOS setup module 141 completes the automatic BIOS setup process, and boots up the OS 107b. On the other hand, when it is determined the manual BIOS setup is requested (Yes at S12), the automatic BIOS setup module 141 notifies the manual BIOS setup module 142 that the manual BIOS setup is requested (S13). As a result, the manual BIOS setup module 142 performs the manual BIOS setup process described later (S13).

Next, when the manual BIOS setup process by the manual BIOS setup module 142 is completed, the automatic BIOS setup module 141 issues a restart command with respect to the south bridge (S14). Then, the steps from S10 are repeated. Here, the restart command is used to restart the PC 100 from a state right after the power is turned on, so that the various settings set through the manual BIOS setup process is also applied during the automatic BIOS setup process.

The manual BIOS setup module 142 is explained next with reference to FIGS. 4 and 5. The manual BIOS setup module 142 includes modules for normal setup process such as power management setup, enabling/disabling on-board devices, and password setup. However, explanations of such modules are omitted, and configurations for USB charging test process described later are explained in the following.

Figure 4:
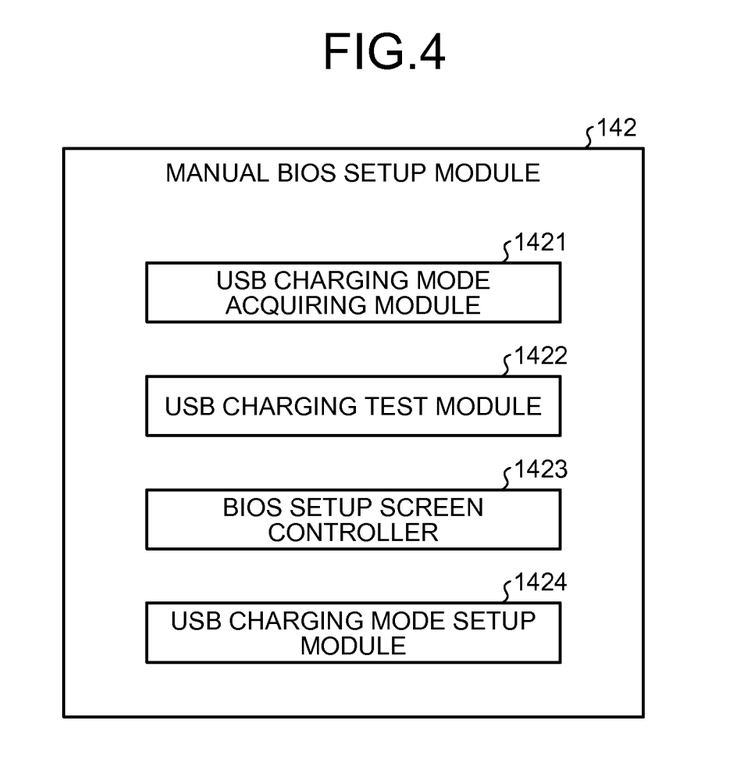
FIG. 4 is an exemplary block diagram of a manual BIOS setup module in the embodiment.

FIG. 4 is a block diagram schematically illustrating a configuration of the manual BIOS setup module 142. The manual BIOS setup module 142 includes a USB charging mode acquiring module 1421, a USB charging test module 1422, a BIOS setup screen controller 1423, and a USB charging mode setup module 1424. Here, each module configuring the manual BIOS setup module 142 is loaded and generated on the main memory 107 when the CPU 101 reads the BIOS 107a from the BIOS-ROM 111 and executes the BIOS 107a.

Figure 5:
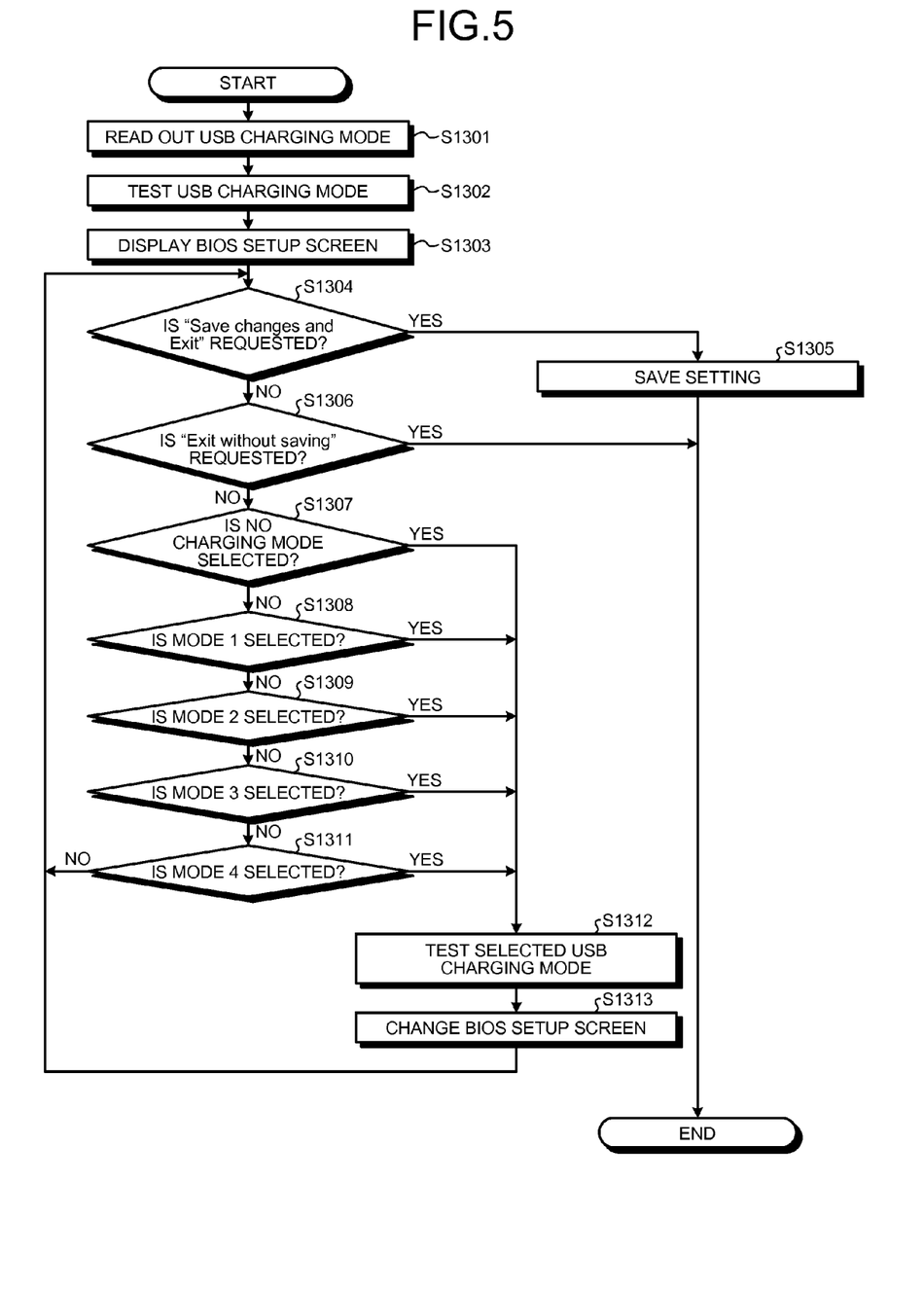
FIG. 5 is an exemplary flowchart of USB charging test process in the embodiment.

FIG. 5 is a flowchart of the USB charging test process by the manual BIOS setup module 142. Upon receipt of a notification that the manual BIOS setup is requested from the automatic BIOS setup module 141, the USB charging mode acquiring module 1421 refers to the non-volatile memory 115, and reads out a USB charging mode stored such that the mode is to be enabled when the PC is not in operation as described later, among the USB charging modes stored in the non-volatile memory 115 (S1301).

Then, the USB charging test module 1422 tests the USB charging mode read out from the non-volatile memory 115 (S1302). In particular, when for example the mode 2 is stored in the non-volatile memory 115 such that the mode 2 is enabled while the PC is not in operation, the USB charging test module 1422 reads out the mode 2 and test the mode 2. In the case of testing the USB charging mode such as mode 2, a predetermined voltage that enables a particular USB device to be charged to a data signal line of the USB device 400, and at the same time supply the predetermined power to the power supply line thereof. Consequently, when the USB device 400 connected to the PC 100 complies with the mode 2, the USB device 400 is charged by the PC 100.

Figure 6:
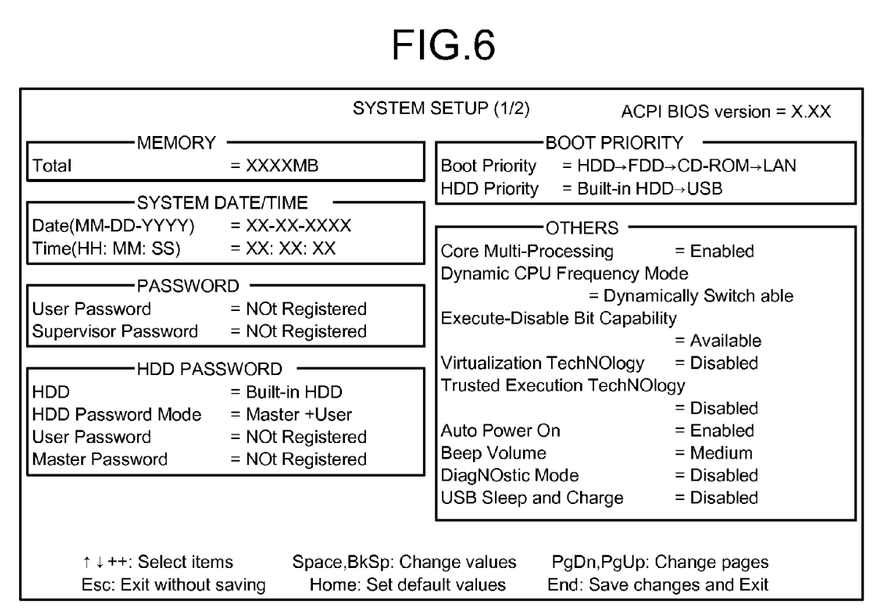
FIG. 6 is an exemplary schematic diagram illustrating a BIOS setup screen in the embodiment.

Subsequently, the BIOS setup screen controller 1423 displays a predetermined BIOS setup screen (S1303). FIG. 6 is a diagram illustrating one example of the BIOS setup screen displayed by the BIOS setup screen controller 1423. As illustrated in FIG. 6, the BIOS setup screen controller 1423 displays an item under "USB Sleep and Charge" in addition to normal setup items such as password setup items including an item under "User Password" and power management items including an item under "Auto Power On." The item under "USB Sleep and Charge" indicates the USB charging mode stored in the non-volatile memory 115 such that the mode is enabled while the PC is not in operation, or the USB charging mode selected by the user as described later. In the present embodiment, when the item under "USB Sleep and Charge" is indicated as "Disabled," the USB charging mode is in the charging prohibiting mode. Furthermore, when the item under "USB Sleep and Charge" is indicated as "Mode 1," the USB charging mode is in mode 1. Furthermore, when the item under "USB Sleep and Charge" is indicated as "Mode 2," the USB charging mode is in mode 2. Furthermore, when the item under "USB Sleep and Charge" is indicated as "Mode 3," the USB charging mode is in mode 3. Furthermore, when the item under "USB Sleep and Charge" is indicated as "Mode 4," the USB charging mode is in mode 4.

Next, the USB charging mode setup module 1424 determines whether the "Save changes and Exit" is requested (S1304). In particular, the USB charging mode setup module 1424 determines whether the End key on the keyboard is pressed down by the user, for example, so as to determine whether all settings including the USB charging mode displayed on the BIOS setup screen are requested to be stored and subsequently escape from the BIOS setup screen is requested. As a result, when it is determined that the "Save changes and Exit" is requested (Yes at S1304), the USB charging mode setup module 1424 stores all the settings displayed on the BIOS setup screen (S1305), and ends the manual BIOS setup process including the USB charging test process. The storing of all the settings displayed on the BIOS setup screen includes storing the USB charging mode that is being tested at when the "Save changes and Exit" is requested such that the USB charging mode is to be enabled when the PC is not in operation, and also storing other USB charging modes in the non-volatile memory 115 such that the other USB charging modes are to be disabled when the PC is not in operation. The USB charging mode is enabled when the PC is not in operation, by raising a flag corresponding to the USB charging mode corresponding to the "Save changes and Exit" request, among the five USB charging modes stored in the non-volatile memory 115.

When the manual BIOS setup module is completed after S14 and S10 of FIG. 3, the automatic BIOS setup module 141 reinitializes the hardware in S11. As a result, the hardware such as the USB controller 109a is initialized, and the test of the USB charging mode executed by the USB charging test process is stopped. Consequently, the OS can control normal USB charging that is performed when the PC is in operation.

When the result of S1304 is No, the USB charging mode setup module 1424 determines whether the "Exit without saving" is requested (S1306). In particular, the USB charging mode setup module 1424 determines whether the ESC key on the keyboard is pressed down by the user, for example, so that it is requested to escape from the BIOS setup screen without saving all the settings including the USB charging mode displayed on the BIOS setup screen. As a result, when it is determined that the "Exit without saving" is requested (Yes at S1306), the USB charging mode setup module 1424 completes the manual BIOS setup process including the mode test process.

On the other hand, when the result of S1306 is No, the USB charging mode setup module 1424 determines whether the charging prohibiting mode is selected as the USB charging mode (S1307). When it is determined that the USB charging prohibiting mode is not selected (No at S1307), the USB charging mode setup module 1424 determines whether the mode 1 is selected (S1308). When it is determined that the mode 1 is not selected (No at S1308), the USB charging mode setup module 1424 determines whether the mode 2 is selected (S1309). When it is determined that the mode 2 is not selected (No at S1309), the USB charging mode setup module 1424 determines whether the mode 3 is selected (S1310). When it is determined that the mode 3 is not selected (No at S1310), the USB charging mode setup module 1424 determines whether the mode 4 is selected (S1311). When the mode 4 is not selected (No at S1311), the process from S1304 are repeated.

On the other hand, when the result of S1307 to S1311 is Yes, the USB charging test module 1422 tests the USB charging mode selected by the user (S1312). In particular, when the mode 2 is selected as the USB charging mode, for example, the USB charging test module 1422 reads out the mode 2 from the non-volatile memory 115, and test the mode 2.

Subsequently, the BIOS setup screen controller 1423 changes the BIOS setup screen (S1313). In particular, the BIOS setup screen controller 1423 changes the notation under the item "USB Sleep and Charge" displayed on the BIOS setup screen to the notation corresponding to the USB charging mode now on testing. For example, when the USB charging mode is changed from the charging prohibiting mode to the mode 1, the BIOS setup screen controller 1423 displays the notation under the "USB Sleep and Charge" as "Mode 1." Then, the USB charging mode setup module 1424 repeats the process from S1304.

In the present embodiment, the USB charging mode is selected when, for example, the user presses down a specific key such as a space key of a keyboard. In particular, the user presses down the up key or down key, for example, to select the item under "USB Sleep and Charge" among various items on the BIOS setup screen. Then, the user presses down a desired USB charging mode by changing the notation of the item under the "USB Sleep and Charge." The notation of the item under "USB Sleep and Charge" is changed sequentially in the order such as "Disabled" to "Mode 1" to "Mode 2" to "Mode 3" to "Mode 4" to "Disabled" and so on. The selection of the various items on the BIOS setup screen is visually recognized by the user since, in response to the selection, the item represented by the font color of white with the background color of black is inverted such that the item is represented by the font color of black with the background color of white.

Next, the process from when the USB charging mode is tested during the POST process until when the USB charging mode is applied while the PC is not in operation are explained. In the following, it is assumed, as an example, that the aforementioned five USB charging mode are stored in the non-volatile memory 115, and the also the USB charging prohibiting mode is stored such that the USB charging prohibiting mode is to be enabled when the PC is not in operation.

Let's assume that the manual BIOS setup is requested by the user during the POST process. In this case, the USB device 400 is not charged since the USB charging mode is set to the charging prohibiting mode. Then, let's assume that the user presses down the space key once. In this case, the mode 1 is tested. However, the USB device 400 does not comply with the mode 1, so that the USB device 400 is still not charged. Here, the user can check that the USB device 400 is not being charged by the selected USB charging mode by observing the lighting of the power light, the charging light, or the like provided on the USB device 400.

Next, let's assume that the user presses down the space key once again. In this case, the mode 2 is tested. The USB device 400 is now charged since the USB device 400 complies with the mode 2. As described above, the user can confirm that the USB device 400 is being charged by looking at the lighting of the charging light or the like. Then, let's assume that the user presses down the End key, and requests to enable the mode 2 when the PC is not in operation and to end the BIOS setup screen. In this case, after the mode 2 is enabled, the automatic BIOS setup process including the initialization of the hardware is performed again. Then, the POST process is completed, and the OS is booted.

Next, let's assume that the user is requested to turn off the PC power when the PC is in operation. In this case, the mode 2 enabled during the POST process is set with respect to the USB device 400, and the power of the PC 100 is turned off. As a result, the voltage defined in the mode 2 is applied to the data signal line of the USB device 400, the USB device 400 is maintained to be chargeable, and the USB device 400 is charged by the PC 100 through the power supply line.

As described above, in the present embodiment, the USB charging executed when the PC is not in operation is tested during the POST process. Consequently, it becomes capable of confirming during the POST process that which USB charging mode allows charging the USB device connected to the PC. The USB charging mode is no longer required to be checked every time the USB charging mode is changed through the utility by turning off the PC as in the conventional technology, thereby inconvenience of the user can be alleviated.

In the present embodiment, the USB charging test process is performed by the manual BIOS setup module. However, instead of the USB charging test process, a test process directed to, for example, a volume (large or small) of a beep sound generated by a beep speaker installed on a mother board may be performed. That is to say, the non-volatile memory can store a plurality of different operation modes. Each of the operation modes operates a predetermined device such as a speaker, which is directly operated by the BIOS, in each of different states, respectively. Upon receipt of a request for selecting one of the operation modes from the user, the manual BIOS setup module acquires an operation mode corresponding to the request from the non-volatile memory, and operates the device in accordance with the acquired operation mode. Consequently, in comparison to the case when the operation mode is tested and set through the utility under operation of the PC, the driver operation is less negatively influenced, so that it becomes possible to suppress PC from being hanged up and operation thereof being unstable.

In the embodiment, the USB charging test process is executed by the BIOS. However, the USB charging test process can be performed by, for example, a micro computer such as the EC, independently of the BIOS. Consequently, it becomes possible to perform the USB charging test process during the time other than the time during the POST process by the BIOS.

In the embodiment, the USB charging mode is tested upon the receipt of the request for manually setting up the BIOS or upon the receipt of the request for selecting the USB charging mode. However, for example, an item indicating execution of the USB charging mode can be provided on the BIOS setup screen, and the test can be performed only when this item is enabled. In this case, the USC charging mode is disabled when the item becomes unselected.

In the embodiment, the screen in FIG. 6 is explained as the example of the BIOS setup screen. However, the embodiment is not limited thereto. In other words, instead of determining whether the "Save changes and Exit" is requested, it may be determined first whether "Save changes" is requested. Then, when it is determined that the "Save changes" is requested, only the USB charging mode can be enabled without finishing the BIOS screen setup. In this case, the BIOS screen setup can be finished when, for example, "Exit" is requested.

In the embodiment, the USB charging mode is not limited to the aforementioned modes 1 to 4. In other words, any USB charging mode can be included as long as the included USB charging mode can charge a predetermined USB device.

In the embodiment, the USB charging modes tested in the USB charging test process are stored in the non-volatile memory such that the mode becomes enabled when the PC is not in operation, by for example turning on a flag in response to the "Save changes and Exit" request. However, the present embodiment is not limited thereto, and for example, a USB charging mode corresponding to the "Save changes and Exit" request can be copied to a predetermined region of a non-volatile memory. Then, in response to each "Save changes and Exit" request, the USB charging mode stored in the predetermined region can be overwritten by a tested USB charging mode, and when the PC is not in operation, the USB charging mode can be read from the region and executed. That is to say, the USB charging mode corresponding to the "Save changes and Exit" request can be stored in any form as long as the USB charging mode can be applied to the USB device when the PC is not in operation.

Further, the BIOS according to the present embodiment is preliminarily stored in the BIOS-ROM and provided. However, the BIOS can be stored in any memory medium such as a compact disk read only memory (CD-ROM), a flexible disc (FD), a compact disc recordable (CD-R), a digital versatile disk (DVD), and provided. Here, the BIOS is stored in the memory medium so as to be capable of being read by the PC. In addition, the BIOS is stored in the memory medium in, for example, installable format or executable format.

The BIOS of the embodiment may be stored in a PC connected to a network such as the Internet, and the BIOS can be downloaded through the network and provided. Further, the BIOS can be provided or distributed through a network such as the Internet.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processor comprising:
a storage module configured to store a plurality of pieces of setting information of a plurality of operation modes, respectively, corresponding to a basic input/output system (BIOS) setup item;
a setting module configured to acquire one of the pieces of setting information of selected one of the operation modes from the storage module during power on self-test (POST) process by a BIOS, to set the one of the pieces of the setting information to the BIOS during the POST process, and to perform a process corresponding to the set one of the pieces of the setting information during the POST process; and
an input module configured to receive a save request for saving the one of the pieces of the setting information set by the setting module and a restart request for restarting the information processor, wherein
the storage module is configured to store therein, during the POST process, the one of the pieces of the setting information according to the save request so that the one of the operation modes associated with the one of the pieces of the setting information is enabled when the information processor is not in operation, and
the setting module is configured to stop performing the process during the POST process when the input module receives the restart request.

2. The information processor of claim 1, wherein
the operation modes differ from each other and are capable of operating different external devices in different states,
during the POST process by the BIOS, the setting module is configured to acquire the one of the pieces of the setting information of the selected one of the operation modes from the storage module, to set the acquired one of the pieces of the setting information to the BIOS, and to operate the external device in a state corresponding to the acquired one of the operation modes.

3. The information processor of claim 2, further comprising:
the input module configured to receive a setting request of the acquired one of the operation modes, and wherein
the setting module is configured to operate, upon receipt of the setting request of the acquired one of the operation modes by the input module, the device in a state corresponding to the acquired one of the operation modes.

4. An information processor comprising:
an executing module configured to charge one of a plurality of external devices connected to the information processor by one of a plurality of charging modes for charging the external devices, respectively, when the operating system is not in operation, wherein the charging modes comprise at least a first charging mode for charging one of the external devices configured to be charged when a predetermined voltage is applied and a second charging mode for charging other one of the external devices configured to be charged when a signal with a predetermined waveform is applied;
a charging module configured to charge one of the external devices connected to the information processor when the information processor is not in operation; and
a setting module configured to set, when an operating system is not in operation, one of the first charging mode and the second charging mode used by the executing module to the charging module so that the one of the first charging mode and the second charging mode is enabled when the information processor is not in operation, the one of the first charging mode and the second charging mode being capable of charging at least one of the external devices connected to the information processor.

5. An information processor comprising:

a storage module configured to store a plurality of charging modes capable of charging a plurality of external devices, respectively;

an input module configured to receive, when an operating system is not in operation, a selection request for selecting one of the charging modes;

an executing module configured to acquire, upon receipt of the selection request, one of the charging modes from the storage module, and to charge, when the operating system is not in operation, one of the external devices connected to the information processor by the one of the charging modes;

a charging module configured to charge, when the information processor is not in operation, one of the external devices connected to the information processor; and a setting module configured to set the one of the charging modes used by the executing module to the charging module so that the one of the charging modes is enabled when the information processor is not in operation, wherein the input module is further configured to receive a restart request for restarting the information processor and a save request for saving the one of the charging modes used by the executing module to charge the one of the external devices, the storage module is configured to save the one of the charging modes in the save request when the input module receives the save request so that the saved one of the charging modes is enabled when the information processor is not in operation, and the executing module is configured to stop charging the one of the external devices by the one of the charging modes when the input module receives the restart request while the operating system is not in operation.

* * * * *